April 30, 1968     M. G. MOORE     3,380,264
TORQUE SENSITIVE DISCONNECT COUPLING
Filed Sept. 30, 1966

INVENTOR:
MARSHALL G. MOORE,
BY *Robert J. Bird*
HIS ATTORNEY.

United States Patent Office 3,380,264
Patented Apr. 30, 1968

3,380,264
TORQUE SENSITIVE DISCONNECT COUPLING
Marshall G. Moore, Danvers, Mass., assignor to General Electric Company, a corporation of New York
Filed Sept. 30, 1966, Ser. No. 583,183
10 Claims. (Cl. 64—28)

The present invention is related generally to shaft couplings. More particularly, it relates to a mechanical shaft coupling which is sensitive to torque and disconnects a driving from a driven member in response to an over-torque condition.

There are many applications for the use of a torque sensitive shaft disconnect coupling. One such use, given here as an example only, is in steam powerplants, where boiler feed pumps are sometimes directly driven from the shaft of the main turbine unit. It is possible, in this direct-drive relationship, that a boiler feed pump might cavitate and start to burn up, or otherwise to make an unreasonable torque demand upon the turbine. It is desirable therefore for the sake of reliability of the system and for protection of the equipment, to provide a means to disconnect the driven boiler feed pump in response to such an over-torque condition.

Accordingly, it is an object of the present invention to provide a mechanical shaft coupling which is sensitive to torque and which responds thereto, to disconnect a driven from a driving member.

Other objects, advantages and features of the present invention will become apparent from the following description of one embodiment thereof, when taken in connection with the accompanying drawing.

Briefly sated, the present invention is practiced in one form by a disconnect shaft coupling in the form of a distance piece or coupling member inserted between and connecting a driving shaft and a driven shaft. The connections between the coupling member and the shafts are splines, at least one set of them being helical. In operation under torque, the coupling member is constantly urged axially toward a disengaged position by the helical splines. It is restrained from disengaging by a pressure chamber abutting against a piston on the axial end face of the coupling member. A rupture diaphragm or relief valve releases the hydraulic fluid from the pressure space when shaft torque reaches such a level as to force the disconnect coupling member against the pressure space with an axial force corresponding to a desired disconnect torque.

Figure 1:
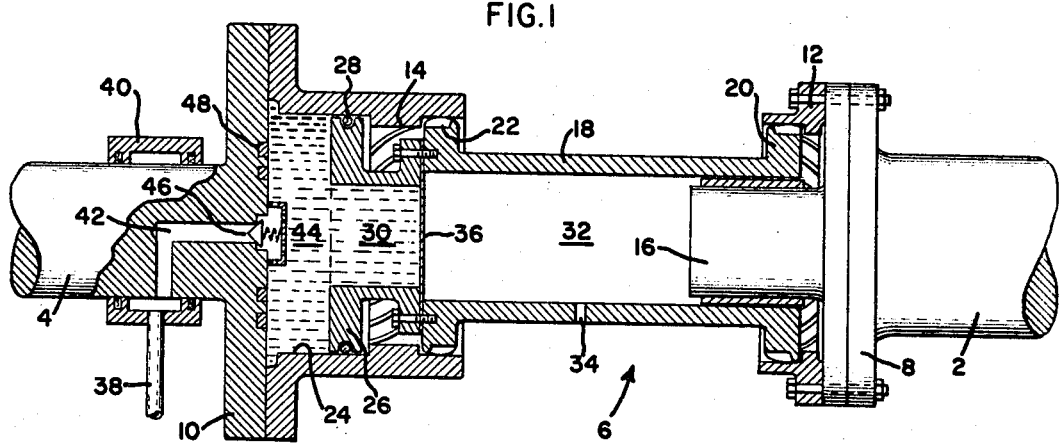
FIG. 1 is a longitudinal elevation, partly in section, of a torque sensitive shaft disconnect coupling according to the present invention.

Referring to the drawing, a driving member or shaft 2 and a driven member or shaft 4 are shown connected in driving relationship through a disconnect coupling, generally indicated at 6. The disconnect coupling 6 is mounted between flange 8 on shaft 2 and flange 10 on shaft 4. An internal ring gear or spline 12 is fixedly mounted to flange 8, and an internal ring gear or spline 14 is fixedly mounted to flange 10. A babbitt surfaced cylindrical bearing member 16 is also fixedly mounted to flange 8. A hollow cylindrical distance piece 18, having gears 20 and 22 on its ends, extends between ring gears 12 and 14 to serve as a coupling member. Internal gear 12 and its mating gear 20 are helical gears, while internal gear 14 and its mating gear 22 are straight spur gears. In one alternative gears 12 and 20 may be straight spur gears, while gears 14 and 22 are helical. In another alternative, gears 12 and 20 may be helical in one hand while gears 14 and 22 are helical in the opposite hand.

Figure 2:
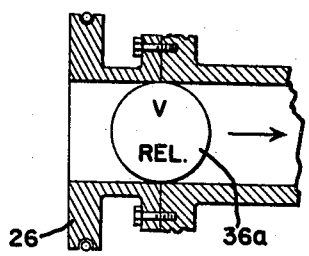
FIG. 2 is a schematic representation of an alternative element used in the present invention.

The extension from ring gear 14 to flange 10 defines a cylinder 24. A piston member 26 is mounted within cylinder 24 and fastened to the end of distance piece 18 adjacent gear 22. An O-ring 28 surrounds the piston 26 in sealing relationship with cylinder 24. Piston 26 defines a central passage 30 therethrough. A chamber 32 is defined by the inner wall of distance piece 18, and is maintained substantially at atmospheric pressure through the presence of a vent passage 34 through the wall of the piston piece 18. A means to relieve pressure after it reaches a preselected value is mounted between passage 30 and atmospheric chamber 32. This means 36 may take the form of a rupture disk, as shown in FIG. 1, or a relief valve as 36a, shown in FIG. 2.

A source of hydraulic pressure is introduced through conduit 38 and through a suitable sealing means 40, to internal passages 42 within the driven shaft 4. Passages 42 communicate with chamber 44 which is defined by the cylinder 24, the piston 26, and the flange face 10. A check valve 46 is situated within passage 42 such that hydraulic fluid from conduit 38 is permitted to move only in the direction toward chamber 44. The face of flange member 10 has magnetic members 48 imbedded therein or otherwise mounted thereto.

In operation, under normal torque loads, as driving shaft 2 exerts torque on driven shaft 4, the gears on distance piece 18 are constantly trying to move the distance piece 18 axially under the influence of the helical internal gears 12 or 14 depending on which is the helical gear. Of course, if both gear sets are helical, the axial forces will be additive. The helical spline teeth generate an axial force which in turn creates a pressure within chamber 44 which is proportional to the torque transmitted. If the torque demanded by driven shaft 4 is of a normal level, then the axial force on distance piece 18 will also be within pre-established normal limits, and no disconnecting will result. However, if, due to some accident or otherwise, the torque demand by shaft 4 is excessive, the proportionally increased axial force on distance piece 18 and piston 26 against the hydraulic fluid in chamber 44 will be such as to either rupture the disk 36 or, in the alternative, to actuate the relief valve 36a which may be used in its stead. The hydraulic fluid then escapes into chamber 32 to atmospheric pressure and the piston 26 and distance piece 18 move toward the left under the axial forces resulting from the gear action to the face of flange 10 where the piston 26 is held by the action of magnets 48. Gears 12 and 20 are thus disconnected, but the end of piece 12 is rotatably supported by the bearing member 16.

If it is desired to disconnect the driven member 4 from the driving member 2 on occasions other than excessive torque situations, this is accomplished by simply shutting off the supply of hydraulic fluid in line 38. Normal leakage from chamber 44 will result in a sufficiently decreased pressure therein so that the normal axial force from the gear tooth action overcomes the diminished hydraulic pressure, and the piston and distance piece are driven against flange 10, disconnecting gears 12 and 20.

It will be appreciated that a torque-sensitive shaft disconnect coupling has herein been described which is effective to disconnect a driven from a driving member in response to a torque overloading. The torque sensitivity is adjustable by the pressure maintained within the pressure chamber 44 and also by the sensitivity of the rupture disk 36 or the relief valve 36a if such is used.

It may occur to others of ordinary skill in the art to make modifications of the present invention which will remain within the concept and scope thereof. For example, the internal gears could be on the distance piece with the external gearing on the driving and driven members. Accordingly, it is intended that the invention be not limited by the details in which it has been described but that it encompass all within the purview of the following claims.

What is claimed is:
1. A disconnect coupling comprising:
   a first gear fixedly mounted to a driving member,
   a second gear fixedly mounted to a driven member and coaxial with said first gear,
   a generally cylindrical member having first gear teeth on the first end portion thereof mating with said first gear and having second gear teeth axially displaced from said first gear teeth and mating with said second gear, said member disposed coaxially with said first and second gears, and being axially slidable so as to disengage at least one set of gear teeth,
   at least one of said gears having helical teeth arranged to provide an axial force on the member in response to torque between said driving and driven members,
   one end of said cylindrical member defining a piston, said piston slidably disposed within a fluid chamber,
   means to relieve pressure of the fluid within said chamber when said torque urges said cylindrical member and said piston against the fluid in said chamber at a predetermined pressure.

2. A disconnect coupling according to claim 1 in which:
   said first and second gears are internal gears and said member has external gears, the second internal gear member and said driven member together defining with said piston, said fluid chamber.

3. A disconnect coupling according to claim 2 in which said means to relieve pressure is a rupture diaphragm separating said fluid chamber from an atmospheric chamber.

4. A disconnect coupling according to claim 2 in which said means to relieve pressure is a relief valve separating said fluid chamber from an atmospheric chamber.

5. A disconnect coupling according to claim 2 further including means to introduce fluid to said chamber while the members are rotating.

6. A disconnect coupling comprising:
   a first internal gear mounted to a driving member,
   a second internal gear mounted to a driven member and coaxial with said first gear, said second internal gear being integral with a cylindrical member,
   a hollow cylindrical distance piece having external gear teeth on one portion thereof mating with said first internal gear and having external gear teeth on another portion thereof mating with said second internal gear and being axially slidable so as to disengage at least one set of gear teeth,
   at least one of said internal gears having helical teeth,
   one end of said distance piece defining a piston,
   said cylindrical member, said driven member, and said piston defining a pressure chamber,
   means to introduce hydraulic fluid to said pressure chamber,
   means to relieve pressure of the fluid within said pressure chamber when torque from said driving to said driven member urges said distance piece and said piston against the hydraulic fluid in said pressure chamber at a predetermined pressure.

7. A disconnect coupling according to claim 6 wherein said last means is a rupture diaphragm separating said pressure chamber from the interior of said distance piece.

8. A disconnect coupling according to claim 6 wherein said last means is a relief valve separating said pressure chamber from the interior of said distance piece.

9. A disconnect coupling according to claim 6 wherein said driven member includes a magnetic member attached thereto and disposed in communication with said pressure chamber.

10. A disconnect coupling according to claim 6 wherein said driving member having a cylindrical bearing member projecting therefrom and extending into said cylindrical distance piece for the support thereof in all axial positions thereof.

References Cited
UNITED STATES PATENTS

| | | | |
|---|---|---|---|
| 2,565,289 | 8/1951 | Zak | 64—28 |
| 2,986,024 | 5/1961 | Power | 64—28 X |
| 3,132,731 | 5/1964 | Shipley | 64—28 X |

HALL C. COE, *Primary Examiner.*